United States Patent [19]

Sharples

[11] 4,132,376
[45] Jan. 2, 1979

[54] AIRCRAFT LANDING GEAR TORQUE SCISSORS WITH UNIVERSAL JOINT AND QUICK DISCONNECT

[75] Inventor: Wilbert Sharples, Marietta, Ga.
[73] Assignee: Lockheed Corporation, Burbank, Calif.
[21] Appl. No.: 832,223
[22] Filed: Sep. 12, 1977
[51] Int. Cl.² .......................................... B64C 25/20
[52] U.S. Cl. ............................................. 244/104 R
[58] Field of Search ............ 244/102 R, 103 R, 104 R, 244/50

[56] References Cited

FOREIGN PATENT DOCUMENTS 124005 10/1944 Australia .............................. 244/104 R
163897  9/1964 U.S.S.R. .................................... 244/50

Primary Examiner—Barry L. Kelmachter
Attorney, Agent, or Firm—John J. Sullivan

[57] ABSTRACT

A ball joint connection for the torque scissors of aircraft landing gear provides realignment of the scissors during stroking of the piston to avoid the usual distortion and wearing of parts in the conventional straight pin hinge. Quick disconnect of the scissors for aircraft towing is accomplished through the simple expediency of rotating the ball portion of the scissors design, upon which two diametrically opposed flats have been machined. The scissors can thereby be easily and quickly disconnected prior to towing and then reconnected for the torque transfer operation. As an added feature a ball rotating and locking device is provided as an integral part of the scissors assembly.

5 Claims, 6 Drawing Figures

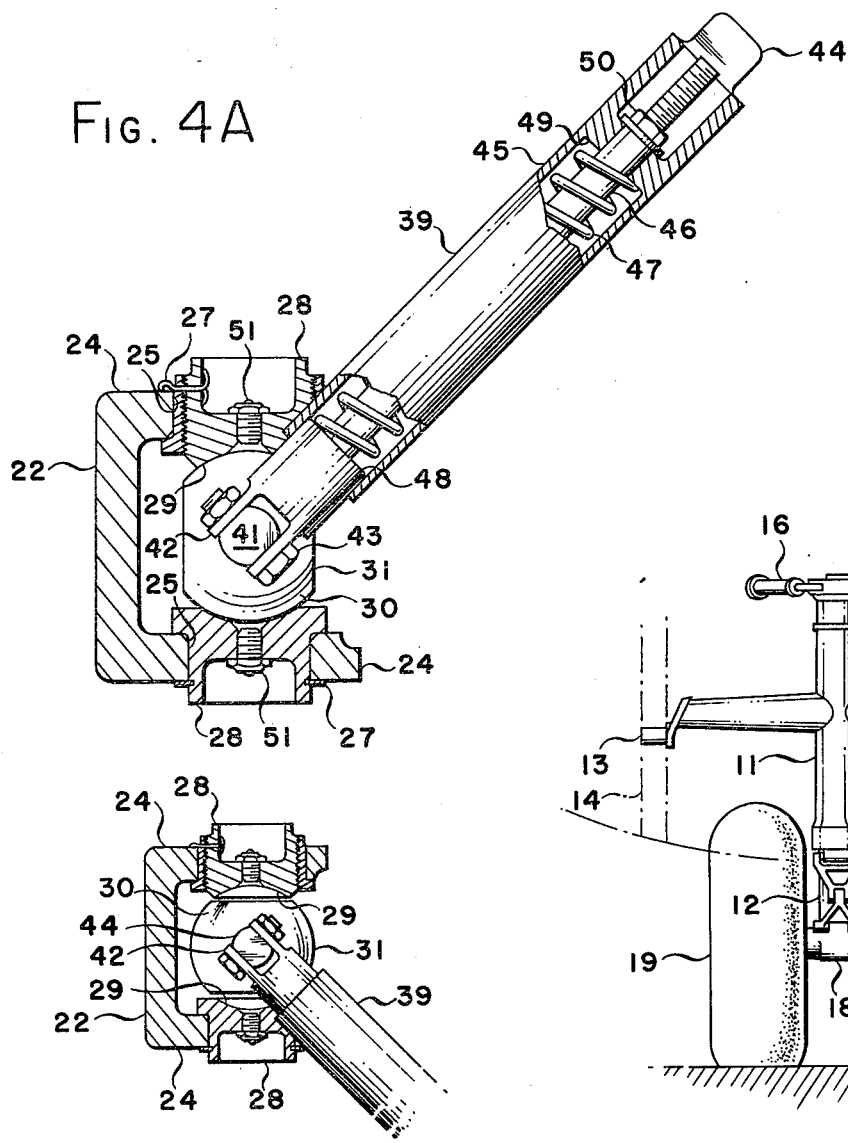
Fig. 4A
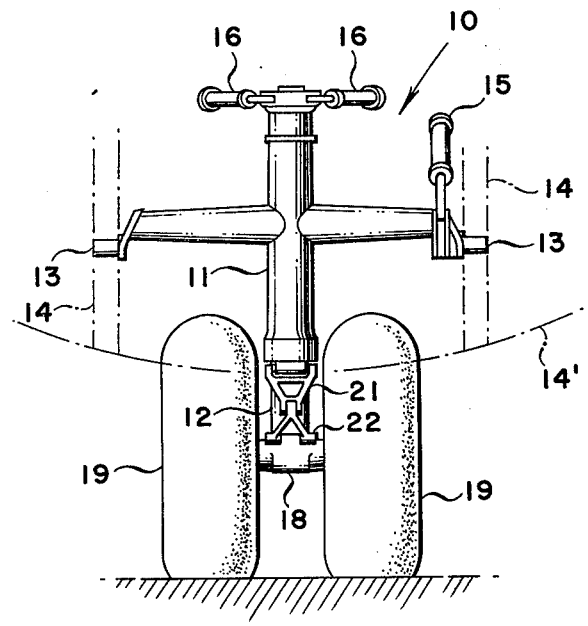
Fig. 1
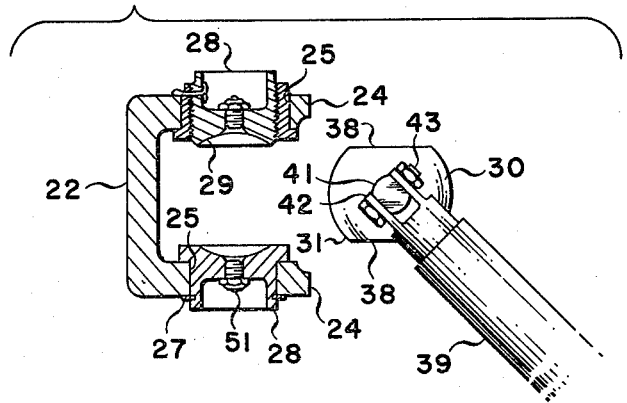
Fig. 4B
Fig. 4C

AIRCRAFT LANDING GEAR TORQUE SCISSORS WITH UNIVERSAL JOINT AND QUICK DISCONNECT

This invention relates in general to landing gear for aircraft and more particularly to the steerable nose gear thereof, contemplating a universal joint with quick disconnect in the torque scissors to prevent secondary loading and distortion of the scissors caused by bending of the strut during certain ground operations of the aircraft.

Torque scissors are employed on aircraft landing gear to interconnect the components of the shock absorbing strut whereby unrestricted relative reciprocation, i.e. telescoping, is permitted while relative rotation is prevented. In the case of the steerable nose wheel gear the torque scissors are also employed to transmit the steering forces to effect rotary movement of the components in unison.

During ground operations of the aircraft, including take-off and landing, as well as ground maneuvering, loads acting on the scissors cause distortion at the hinge points thereof making a universal joint most desirable. In the case of steerable nose gear such a universal joint has not generally been used because of design complications heretofore practiced in satisfying the requirement to disconnect torque scissors during towing lest the restrictive movement thereof effected by the steering system cause distortion and damage to the linkage.

It has therefore become the practice to design torque scissors so as to include at least one removable pin across one of its hinges. This, in turn, necessitates either a complex design or a tool to facilitate the removal and replacement of the pin with the accompanying inconveniences and inevitable misplacement and/or loss of parts.

As an alternative to the above practice, steering systems have been especially designed to permit the by-pass operation of the forces which produce turning of the wheel whereby otherwise restrictive action is rendered ineffective. Such designs at least become overly complex and at best are capable of only limited angular or rotary freedom.

The present invention proposes an improvement in this operation by providing a universal joint for the torque scissors of steerable nose gear capable of being quickly disconnected and reconnected. This universal joint constitutes, in effect, an integral part of the torque scissors assembly at all times, thereby avoiding the possibility of misplacement and/or loss of parts. At the same time this universal joint incorporates a built-in actuator to facilitate the connection, disconnection and reconnection of the torque scissors assembly whereby no separate or special tool is required.

More specifically, the universal joint herein proposed comprises a ball joint carried by and extending from one of the scissors elements and adapted to seat in a complemental socket carried by the other scissors element. This ball joint is formed with localized surfaces defining a transverse ball dimension which is less than that of the socket when disposed in a pre-selected relative orientation permitting withdrawal of the ball from the socket. An engagement normally operative between the ball and the adjacent scissors element retains the ball and socket out of this pre-selected position whereby the mating ball and socket surfaces abut and the necessary universal movement is effected.

Associated with this engagement is a lever which facilitates the movement of the ball to the pre-selected position to permit its withdrawal from its slot whereby the scissors elements are disengaged. This same lever also facilitates a return of the ball out of the pre-select position to reconnect the scissors elements through the mating ball and socket surfaces when the ball is re-inserted into the socket through the slot therein.

With the above and other objects in view as will be apparent this invention consists in the construction, combination and arrangement of parts all as hereinafter described, claimed and illustrated in the accompanying drawings wherein:

FIG. 1 is a front elevation of a typical nose landing gear wheel arrangement employed on aircraft shown in its fully extended position and supporting the aircraft when grounded, the adjacent aircraft structure being illustrated in phantom lines;

Figure 2:
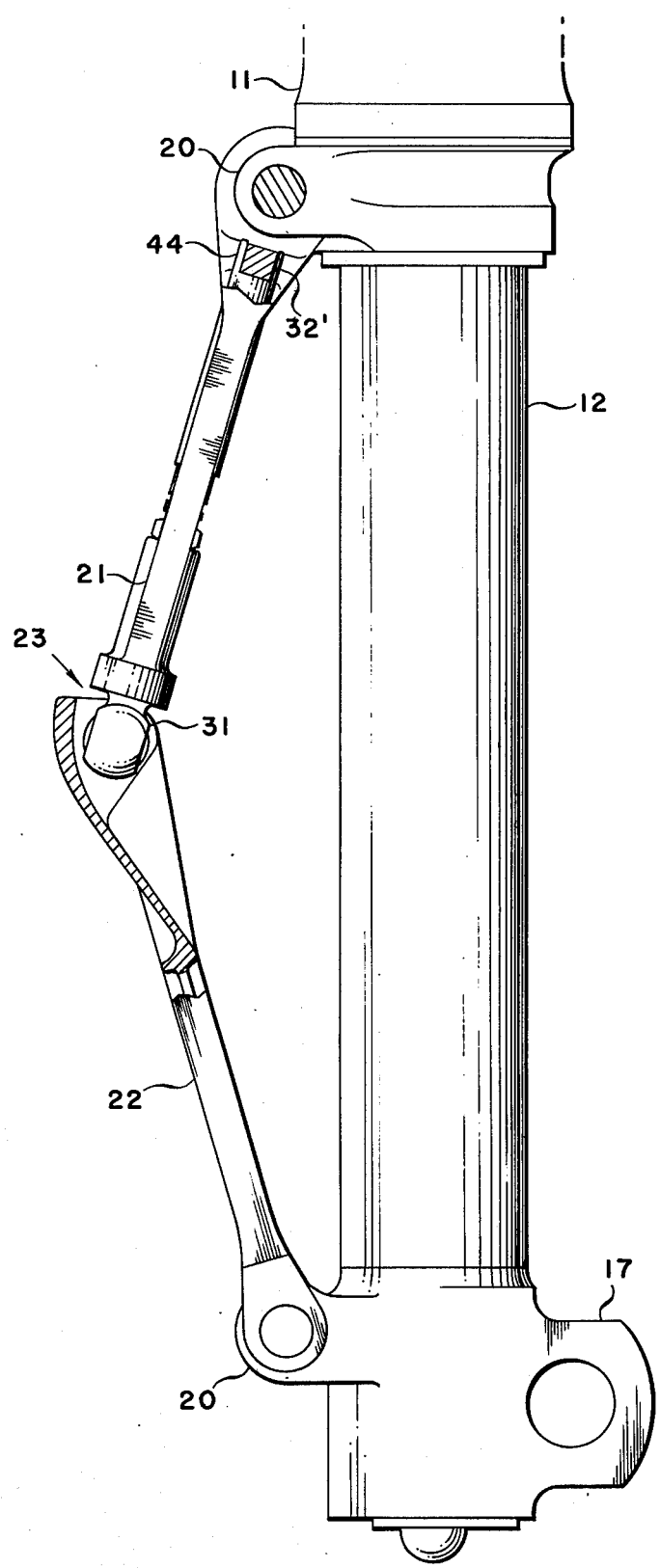
FIG. 2 is a side elevation of a portion of the shock absorbing strut of the landing gear of FIG. 1 to show primarily the torque scissors designed and constructed in accordance with the teachings of this invention.
Figure 3:
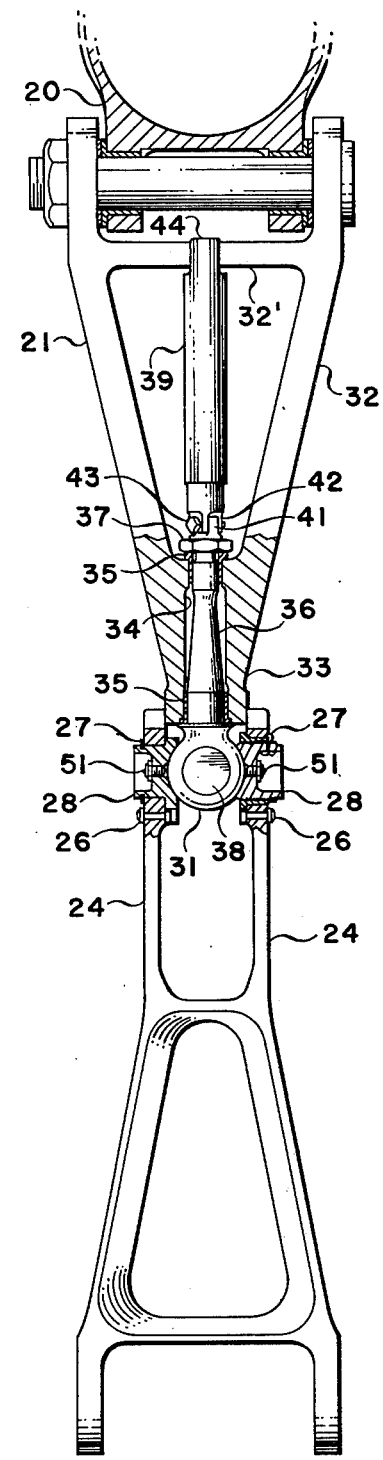

FIG. 3 is a view taken at right angles to FIG. 1 of the torque scissors only with parts thereof broken away in the area of the universal joint to reveal the several essentials thereof; and FIG. 4A, 4B and 4C is a series of sections each taken along the same cut through the universal or ball joint to show the sequence of positions of the ball in the socket in its movement to and from positions connecting and disconnecting the scissors elements.

Referring more particularly to the drawings, 10 designates a nose landing gear wheel assembly typical of those employed on aircraft. Essentially this gear 10 includes a shock absorbing strut comprising a pair of telescoping units 11 and 12 containing fluid as the shock absorbing medium. The upper telescoping unit 11 is trunnion-mounted as at 13 to fixed structure 14 of the aircraft whereby it is adapted to swing to and from retracted and extended positions within the outer contour 14' of the aircraft under the power of a suitable actuator 15. Steering actuators 16 are operatively connected to the upper telescoping unit 11 for the rotation thereof to accomplish the necessary ground manuevers of the aircraft, as will become more apparent.

At its outer end the lower telescoping unit 12 terminates in a lug 17 constituting a mount for an axle 18 on which a ground contacting wheel or wheels 19 are mounted in the customary manner. A generally similar lug 20 is carried by the lower ends of both the upper and the lower units 11 and 12. These lugs 20 project laterally from their respective units 11 and 12 to lie in alignment with each other. The opposite outer ends of a pair of scissors elements or links 21 and 22 are thereby adapted to be pivotally connected one to each lug 20.

At their adjacent ends the links 21 and 22 thus connected to the upper and lower telescoping units 11 and 12 respectively are adapted to be interconnected by means of and through a universal joint 23. To this end one of the links for example, the lower link 22 terminates in a pair of spaced arms 24 pierced transversely by aligned openings 25 each adapted to mount and secure a bearing 28, as for example by a pin 26 and snap ring or cotter key 27 or the equivalent. The bearings 28 are each formed with arcuate surfaces 29 which face one another and coact with complemental spherical surfaces 30 on a projection 31 carried by the upper scissors element 21.

More specifically, the upper link 21 is formed or otherwise provided with a pair of spaced arms 32 which extend from its pivotal connection on the lug 20 and converge in a neck 33 defining a longitudinal bore 34 which opens at the end face of the link 21 adjacent the lower link 22. The bore 34 is lined with a bushing 35 at each of its ends through which the shank of a bolt 36 passes. The projection 31 is carried by the bolt 36 at its outer end and forms in effect an integral part of the upper link 21 being secured thereto by a nut 37 mounted on the opposite end of the bolt 36 and disposed between the arms 32.

In order to permit the disconnection of the upper link 21 from the lower link 22 when desired, the opposite sides of the projection 31 i.e., the sides at right angles to the spherical surfaces 30 are flattened, as at 38, so as to give the projection a transverse dimension less than the minimum dimension of the space located between the bearings 28. Thus, rotation of the bolt 36 about its axis causes the projection 31 to rotate on the arcuate surfaces 29 until they are free from contact with such surfaces 29 and may be withdrawn from between the bearings 28.

Disconnection of the upper link 21 from the lower link 22 by withdrawal of the projection 31, as above described, is facilitated by means of and through a lever 39 provided as an integral part of the bolt 36. To this end the bolt 36 includes an extension 41 on its inner end terminating between the arms 32. The lever 39 terminates at one end in a clevis 42 adapted to receive the extension 41 to which it is pivotally connected by pin 43. The pin 43 is oriented at approximately 45° to the flats 38. At its other end the lever 39 terminates in a clevis 44 adapted to straddle and thereby engage an integral cross beam 32' or the equivalent between the spaced arms 32. This clevis 44 is carried by and extends from a spring-loaded sleeve 45 slideably mounted on a central rod 46 which carries the clevis 42 at the opposite end of the lever 39. The rod 46 has a length of reduced transverse dimension to accomodate a compression spring 47 the opposite ends of which abut shoulders 48 and 49 carried by the rod 46 and sleeve 45 respectively causing the lever 39 to extend at all times, when free to do so, to its full length. A retaining nut 50 on the outer end of the rod 46 acts in opposition to the shoulder 49 to prevent the total separation of the sleeve 45 from the rod 46 whereby the lever remains a unitary assembly at all times. The 45° orientation of pin 43 together with clevis 44 forms a locking device to prevent inadvertent rotation of the ball joint.

In view of the foregoing arrangement and construction it should be apparent that rotation of the lever 39 about the pin 43 disposes it at an angle relative to the bolt 36. It thereby constitutes an integral tool for rotation of the projection 31 to and from extreme positions where its spherical surfaces 30 are in contact with the arcuate surfaces 29 of the bearings 28 and out of such contact with the surfaces 29 at which time the flat surfaces 38 of the projection 31 are adjacent the arcuate bearing surfaces 29. In the former position of the lever 39 the links 21 and 22 are interconnected by the projection 31 for universal movement, while in the latter position of the links 21 and 22, projection 31 may be withdrawn from between the bearings 28 and the links 21 and 22 disconnected from each other.

In order to secure the links 21 and 22 in the connected condition, the lever 39 is rotated about the pin 43 into axial alignment with the rod 36. To permit this the length of the lever 39 is reduced by sliding the sleeve 45 on the rod 36 in opposition to its normal position under the force of its spring 47. When axially aligned, the sleeve 45 may be released to move the clevis 44 into straddling engagement with the crossbeam 32' under the action of the spring 47. Subsequent, disconnection of the links 21 and 22 may be accomplished by reversing this operation. Thus connection, disconnection and reconnection of the links 21 and 22 may be accomplished and repeated any number of times.

In order to facilitate the required free swivelling or universal movement of the upper and lower links 21 and 22 through their ball and socket connection special lubrication means may be provided. To this end a conventional fitting such as a grease nipple 51 may be incorporated in the bearing 28 to receive an appropriate lubricant which is thereby transmitted to the surfaces 29 and 30 of the bearing 28 and projection 31 respectively.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. A torque scissors for the telescoping units of a landing gear strut of aircraft comprising a pair of links, each link terminating at one end in a mount for pivotal connection to a different one of said telescoping units, one of said links terminating at its other end in a sphere modified to include a pair of diametrically opposed flat surfaces and the other of said links terminating at its other end in a pair of spaced arcuate surfaces to receive said sphere and to thereby permit the interengagement of said links for substantially universal movement, and a lever pivotally connected to and projecting from said sphere for the movement thereof relative to both said links whereby said flat sphere surfaces are disposed adjacent said spaced arcuate surfaces and the sphere is out of the interengaging position to thereby permit the separation of said links.

2. The torque scissors of claim 1 wherein said lever includes engagement means adjacent its projecting end to secure the lever with said sphere in the interengaging position.

3. The torque scissors of claim 2 wherein said lever includes a variable length extension.

4. The torque scissors of claim 3 wherein said variable length extension includes a sleeve slidably mounted on said lever, a compression spring operative between said lever and said sleeve and wherein said engagement means is carried by said sleeve and includes a clevis engageable with one of said links.

5. The torque scissors of claim 1 wherein said lever is pivotally connected to said sphere about an axis oriented approximately 45° to said flat opposed surfaces.

* * * * *

UNITED STATES PATENT AND TRADEMARK OFFICE
CERTIFICATE OF CORRECTION

PATENT NO. : 4,132,376
DATED : January 2, 1979
INVENTOR(S) : WILBERT SHARPLES

It is certified that error appears in the above–identified patent and that said Letters Patent are hereby corrected as shown below:

In FIGURE 4B of the drawings reference character "44" should be --41--

*Signed and Sealed this*

*Twenty-fourth* Day of *April 1979*

[SEAL]

Attest:

RUTH C. MASON
*Attesting Officer*

DONALD W. BANNER
*Commissioner of Patents and Trademarks*